US012067791B2

(12) United States Patent
Melamed

(10) Patent No.: US 12,067,791 B2
(45) Date of Patent: Aug. 20, 2024

(54) METHOD AND SYSTEM FOR ROADS' MAINTENANCE

(71) Applicant: INUITIVE LTD., Ra'anana (IL)

(72) Inventor: Eldad Melamed, Ra'anana (IL)

(73) Assignee: INUITIVE LTD., Ra'anana (IL)

( * ) Notice: Subject to any disclaimer, the term of this patent is extended or adjusted under 35 U.S.C. 154(b) by 126 days.

(21) Appl. No.: 17/847,977

(22) Filed: Jun. 23, 2022

(65) Prior Publication Data

US 2023/0419686 A1 Dec. 28, 2023

(51) Int. Cl.
*G06V 20/56* (2022.01)
*B64C 39/02* (2023.01)
*B64U 101/30* (2023.01)

(52) U.S. Cl.
CPC .......... *G06V 20/588* (2022.01); *B64C 39/024* (2013.01); *B64U 2101/30* (2023.01); *B64U 2201/10* (2023.01)

(58) Field of Classification Search
CPC ............... G06V 20/588; B64C 39/024; B64U 2101/30; B64U 2201/10
See application file for complete search history.

(56) References Cited

U.S. PATENT DOCUMENTS

| | | | | |
|---|---|---|---|---|
| 9,863,928 | B1* | 1/2018 | Peterson | G01N 33/42 |
| 11,145,202 | B1* | 10/2021 | Buentello | G08G 1/141 |
| 2010/0014712 | A1* | 1/2010 | Sampedro Diaz | G01C 21/3815 |
| | | | | 382/104 |
| 2018/0027215 | A1* | 1/2018 | Carlson | H04N 7/183 |
| | | | | 348/148 |
| 2022/0019829 | A1* | 1/2022 | Tal | G06V 20/58 |

* cited by examiner

*Primary Examiner* — Gims S Philippe
(74) *Attorney, Agent, or Firm* — Browdy and Neimark, PLLC

(57) ABSTRACT

An autonomous mobile platform is described. The autonomous mobile platform is configured for use in road monitoring, and comprising: a scanning module configured to be used for road scanning in order to enable identifying hazards associated with the road being scanned; a location finder, configured to determine locations of hazards identified at the road being scanned; and at least one transmitter comprised in a respective autonomous mobile platform, and configured to transmit data derived by the scanning module from the road scanning.

7 Claims, 1 Drawing Sheet

METHOD AND SYSTEM FOR ROADS' MAINTENANCE

TECHNICAL FIELD

The present disclosure generally relates to the field of data collection and in particular to the collection of data for road maintenance.

BACKGROUND

Monitoring the condition of road infrastructure has become increasingly important over recent years. Construction projects (such as water system and fiber optic network installations, inclement weather) and high usage are common causes of poor road conditions. Poor road conditions, including lane closures and potholes, cause traffic congestion, especially in large developing cities. Poorly maintained road surfaces also result in motorists incurring higher vehicle maintenance costs.

Thus, road maintenance is typically applied on roads from motorways to unclassified roads to ensure their integrity and that they remain safe for vehicles travelling along these roads.

The present invention seeks to provide a solution that enables automation of road monitoring processes which in turn may save time and resources for affecting road maintenance, a solution which is not provided by prior art systems.

SUMMARY OF THE DISCLOSURE

The disclosure may be summarized by referring to the appended claims.

In accordance with one embodiment of the present invention, it is an object of the present invention to provide an autonomous device for road monitoring.

It is another object of the present invention to provide a system that comprises a plurality of autonomous devices which are adapted to scan roads being monitored.

It is still another object of the present invention to provide a system that is configured to determine priorities for the maintenance of detected hazards in the monitored roads.

Other objects of the present invention will become apparent from the following description.

According to a first embodiment of the present disclosure, there is provided an autonomous mobile platform configured for use in road monitoring, and comprising:
 a scanning module, configured to be used for road scanning in order to enable identifying hazards (e.g., holes, road infrastructure problems, road obstructions and the like) associated with the road being scanned;
 a location finder, configured to determine locations of hazards identified at the road being scanned; and
 at least one transmitter comprised in a respective autonomous mobile platform, and configured to transmit data derived by the scanning module from the road scanning.

The term "autonomous vehicle" as used herein throughout the specification and claims is used to denote a vehicle capable of sensing its environment which operates without human involvement (such as an autonomous car or autonomous drone for example). This term as used herein also encompasses vehicles that are remotely controlled.

According to another embodiment of the present disclosure, the autonomous mobile platform further comprises at least one processor, configured to process information retrieved by the at least one autonomous mobile platform and detect existence of hazards at the scanned road based on the processed information.

In accordance with another embodiment of the present disclosure, upon detecting the existence of hazards at the scanned road, the at least one transmitter is configured to forward location indications (e.g., an alarm message) that relate to the locations of the detected hazards to a remote server.

By yet another embodiment of the present disclosure, the autonomous mobile platform further comprises an optical depth sensor (e.g., an image capturing means such as a 3D camera, operative to generate a matrix of pixels which indicate the distances to points included within the scene being captured), configured to capture one or more images of detected hazards.

In accordance with still another embodiment of the disclosure, the autonomous mobile platform is a drone or an autonomous vehicle.

According to another aspect of the disclosure, there is provided a road monitoring system, comprising a plurality of autonomous mobile platforms, one or more receivers configured to receive transmissions transmitted by the transmitters associated with the plurality of autonomous mobile platforms, and at least one processor (e.g., a server) configured to retrieve, based on the received transmissions, the determined locations of the road hazards.

According to another embodiment of this aspect of the disclosure, each of the autonomous mobile platforms, further comprises an image capturing means, configured to capture one or more images of each detected hazard, and wherein the at least one processor is further configured to analyze information associated with the detected hazards.

In accordance with another embodiment of this aspect of the disclosure, the analyzed information is applied by the at least one processor to determine risks associated with the detected hazards.

By still another embodiment of this aspect of the disclosure, the at least one processor is used to prioritize the determined risks, and to initiate maintenance activities based on the priority of the determined risks.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Road maintenance is a task that is carried out on roads starting from unclassified roads to motorways in order to ensure that their integrity and that they remain safe for the vehicles travelling along these roads. Road maintenance takes many forms, from pothole repairs to re-applying highway surfacing. One of the challenges associated with this task is to become aware as quickly as possible of road problems and their severity, in order to ensure they repair on the one hand, but also that the repairs are being carried out in accordance with the risk level that the hazard (obstacle) presents to the drivers that reach that point at the road where the hazard is detected. The challenge is further intensified when taking into account that roads' lengths are getting longer each year. Thus, the present invention seeks to propose a solution to tackle this challenge.

Figure 1:
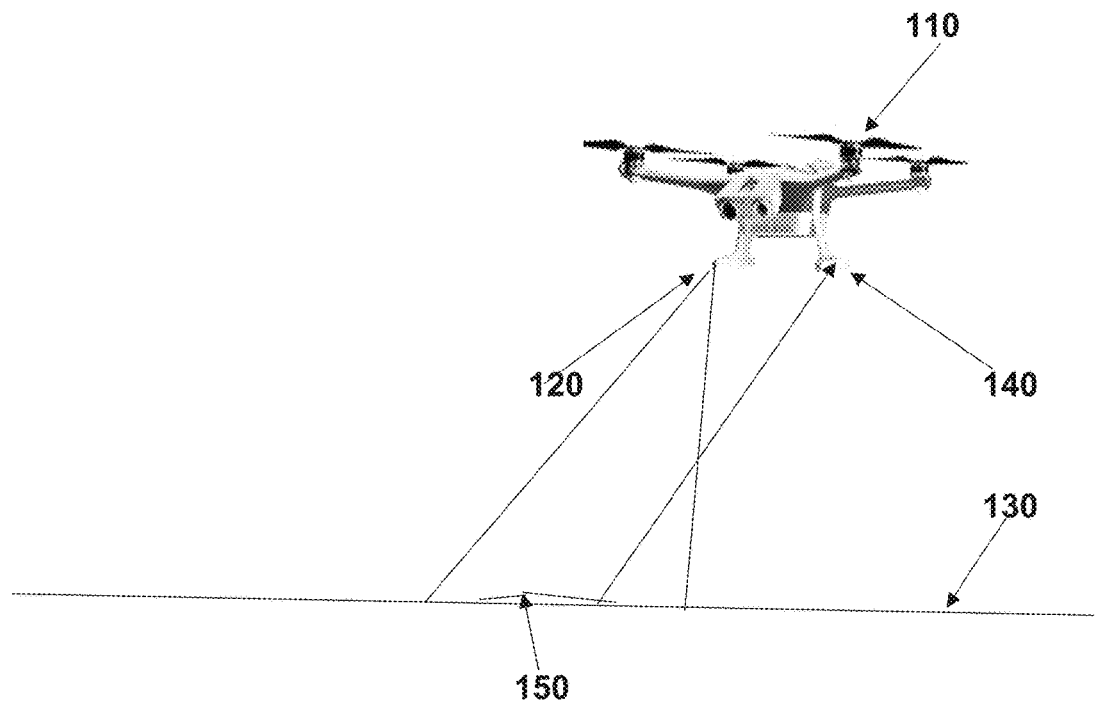
FIG. 1—is an illustrative view of an example of an embodiment construed in accordance with the present disclosure of an autonomous mobile platform operating as a road monitoring apparatus.

FIG. 1 is an illustrative view of an example of an embodiment construed in accordance with the present disclosure of an autonomous mobile platform operating as a road monitoring apparatus.

In this example, autonomous drone 110 is provided with instructions regarding road 130 that needs to be surveyed, and upon receiving these instructions, it starts flying towards road 130. Once it reaches the defined starting point for the road survey, it activates its scanning module 120 and begins scanning road 130.

Figure 2:
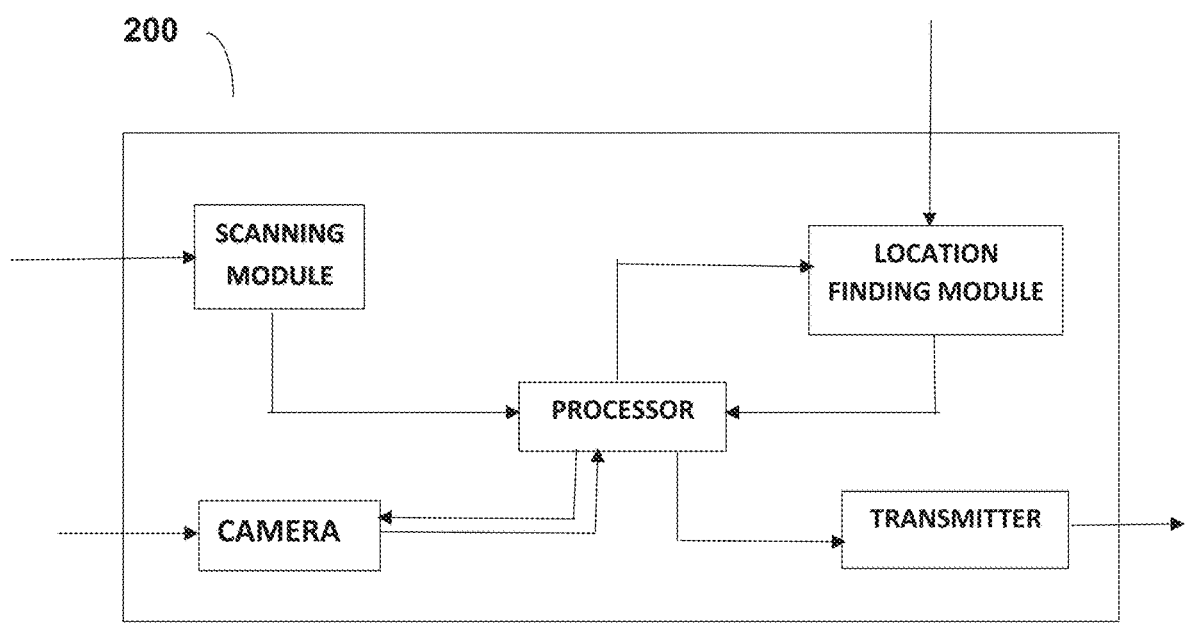
FIG. 2—is a schematic block diagram exemplifying certain modules comprised in an autonomous mobile platform construed in accordance with an embodiment of the present invention.

Once an obstacle 150 is detected along the road, an optical depth sensor, being an image capturing device 140 (e.g., a 3D camera) captures the image of the obstacle and transmits the information to a monitoring center (not shown) where the information is analyzed and a decision on how to solve the problem is taken. The information transmitted includes data associated with a matrix of pixels that indicate the distances from the optical depth sensor to different points at the obstacle included in the captured image, so that the decision taken may be based on parameters associated with its dimensions, the hazard level it presents, etc. FIG. 2 demonstrates in a schematic way, a mobile platform 100 adapted for carrying out road monitoring activities and construed in accordance with an embodiment of the present invention.

In accordance with this embodiment, the mobile platform 200 which may be for example an autonomous vehicle (a drone, car etc.) reaches the road being monitored, and activates its scanning, module 210. The road is being scanned while the autonomous mobile platform proceeds along that road. The scanning results according to this example are forwarded to processor 220 and are being analyzed by the processor. Once the processor detects a hazard at the road such as a pothole, or an area of the road that is suspected to have a hazard, processor 220 instructs location finder 230 (e.g., a GPS unit) to provide the processor with the location of that area, and instructs camera 240 to capture at least one image of the area containing the hazard (or the suspected hazard). According to one option, processor 220 provided with image analyzing capabilities, so it analyzes the image taken, decides whether the suspected area contains a real hazard (or instructs camera 240 to take one or more image). The decision on whether a real obstacle is indeed detected, ma be taken by using any method known in the art per se, such as an artificial intelligence using a neural network, and the like. Once it has been decided that a real hazard was detected, the information is forwarded to transmitter 25, which comprise data that relates to the image (or the image itself), the location of the identified hazard, and any other relevant information, if applicable. Transmitter 250 then transmits the received information to a monitoring center where the information is further processed.

In accordance with another option, processor 220 does not analyze the image received and every time a hazard or a suspected hazard is detected, processor 220 forwards the information (i.e., the image, the location and any other relevant information if any; to transmitter 250, which in turn transmits the received information to a monitoring center where the information is further processed.

Base-d on the received image (and any other applicable information received at the monitoring center, the hazards and their associated risks are analyzed and prioritized based on their risk levels. Once the risk level of the various hazard is determined, a decision is taken on which hazard to solve first, and a maintenance team is sent to the location of the high-risk hazards based on their priority, to handle the problem found.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features.

Variations of embodiments described herein and embodiments of the present invention comprising different combinations of features noted in the described embodiments will occur to persons of the art. The scope of the invention is limited only by the following claims.

The invention claimed is:

1. An autonomous mobile platform configured for use in road monitoring, and comprising:
  a scanning module, configured to be used for road scanning in order to enable identifying hazards associated with the road being scanned;
  a location finder, configured to determine locations of hazards identified at the road being scanned;
  a 3D camera, being an optical depth sensor, configured to capture one or more images of each detected hazard, said 3D camera is operative to generate a matrix of pixels which indicates distances to points included within the hazards identified at the road being scanned; and
  at least one transmitter comprised in a respective autonomous mobile platform, and configured to transmit data associated with said generated matrix of pixels, thereby enabling taking a decision on a risk level which a specific hazard presents, based on parameters associated with said hazard dimensions.

2. The autonomous mobile platform of claim 1, further comprising at least one processor, configured to process information retrieved by the at least one autonomous mobile platform and detect existence of hazards at the scanned road based on the processed information.

3. The autonomous mobile platform of claim 2, wherein upon detecting the existence of hazards at the scanned road, the at least one transmitter is configured to forward location indications that relate to the locations of the detected hazards.

4. The autonomous mobile platform of claim 1, wherein the autonomous mobile platform is a drone or an autonomous vehicle.

5. A road monitoring system, comprising a plurality of autonomous mobile platforms of claim 1, one or more receivers configured to receive transmissions transmitted by the transmitters associated with said plurality of autonomous mobile platforms, and at least one processor configured to retrieve based on the received transmissions, the determined locations of the road hazards.

6. The road monitoring system of claim 1, wherein the analyzed information is used by the at least one processor to determine risks associated with the detected hazards.

7. The road monitoring system of claim 6, wherein the at least one processor is used to prioritize the determined risks, and to initiate maintenance activities based on the priority of the determined risks.

* * * * *